3,682,602
METHOD OF PRODUCING CALCIUM CHLORIDE AND SODIUM CHLORIDE

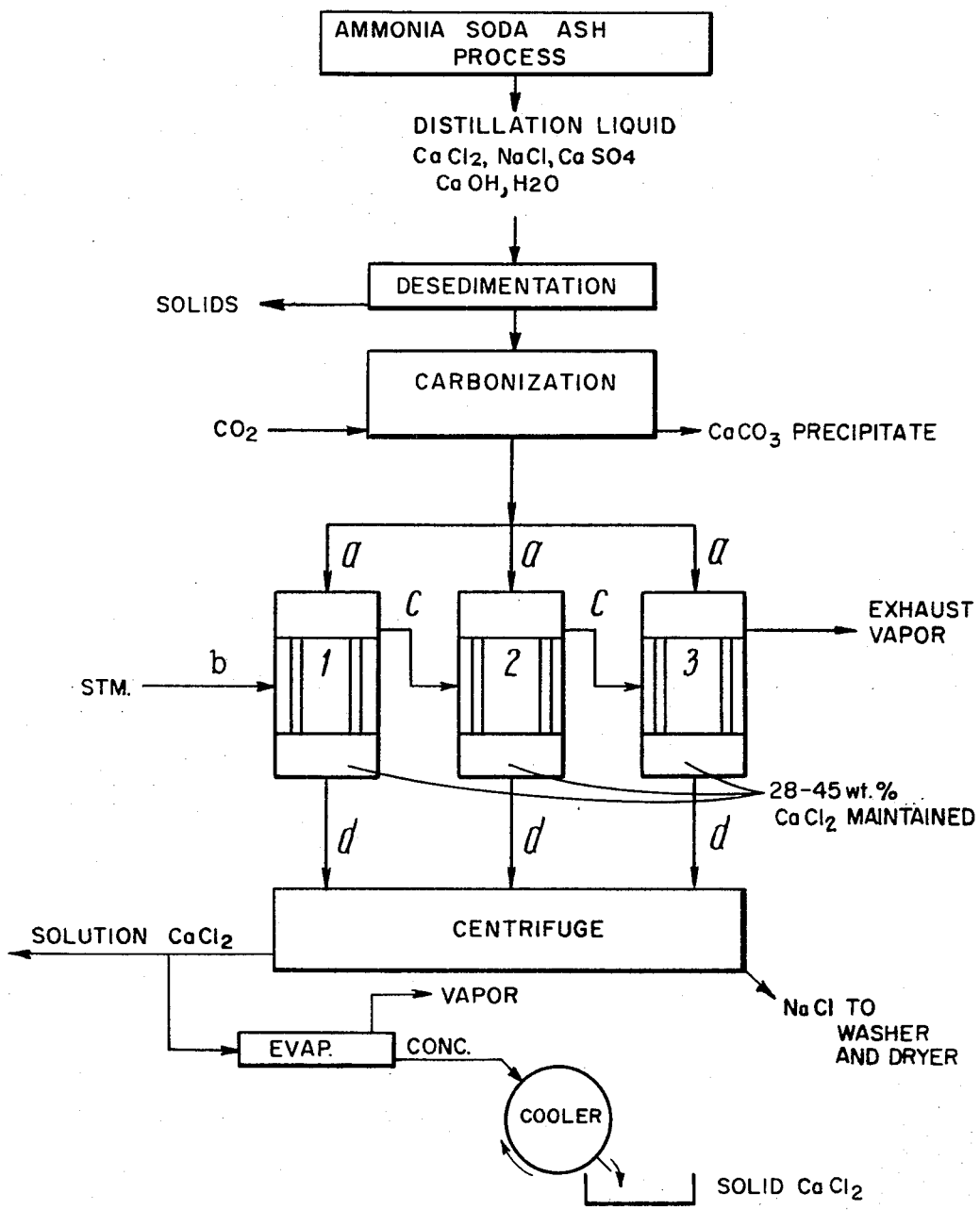

Eduard Mikhailovich Mitkevich, ulitsa Inzhenernaya 9/13, kv. 63; Vladimir Nikolaevich Korobanov, ulitsa Darvina 19, kv. 35; Vera Jurievna Babkina, ulitsa Ekonomicheskaya 1, kv. 36; Alexandra Filippovna Shakhova, ulitsa Chaikovskogo 25, kv. 23; Vladimir Nikolaevich Mefodiev, pereulok Zernovoi 6/1, kv. 101; and Nikolai Ivanovich Gaidash, pereulok Zernovoi 6/1, kv. 117, all of Kharkov, U.S.S.R.
Filed Nov. 17, 1970, Ser. No. 90,266
Int. Cl. B01d 1/26, 1/00; C01d 1/30, 3/00, 3/12; C01f 5/30
U.S. Cl. 23—303　　　　2 Claims

ABSTRACT OF THE DISCLOSURE

Calcium and sodium chlorides are produced by evaporating the distillation liquid resulting from the ammonia soda ash production process. This liquid is clarified and introduced into the evaporators to mix with a concentrated calcium chloride solution contained therein, the concentration of calcium chloride in such a mixed solution being maintained at 28–45 wt. percent. In the process according to the method disclosed herein, steam is passed consecutively through all the evaporators of the plant.

The application of the proposed method practically precludes the formation of gypsum deposits on the heating surfaces of the evaporators.

---

The present invention relates to a method of producing calcium and sodium chlorides from the distillation liquid of the ammonia soda ash production process.

Known in the present state of the art is an industrial method of producing calcium and sodium chlorides from the distillation liquid of ammonia soda ash production process, said liquid resulting from the distillation of the mother liquor of sodium bicarbonate and being usually found to mostly contain (in wt. percent): calcium chloride, about 8–11; sodium chloride, 5–9; calcium sulphate, 0.1–0.15; calcium hydroxide, 0.1; water being the balance.

Producing of calcium and sodium chlorides from said liquid is effected by clarifying followed by a consecutive evaporation concentration in a number of stages from the initial calcium chloride concentration from 8–11 to 38–40 wt. percent.

The process is run in a multiple-effect evaporator plant wherein evaporators are serially-interconnected along the flow of steam used to effect the evaporating process, and of the liquid being vaporized. During the initial step of evaporation the process is conducted till the concentration of calcium chloride is about 14–15 wt. percent at a temperature of the order of 104° C., then the liquid containing calcium chloride at the above-said concentration is passed into a second evaporator, wherein evaporation occurs until the concentration of calcium chloride of about 17–18 wt. percent at a temperature of approximately 90° C. is obtained, whereupon the liquid goes into a third evaporator, wherein the evaporation process runs till the concentration of calcium chloride is of the order of 38–40 wt. percent at a temperature of about 75° C. under vacuum. At such a concentration of calcium chloride sodium chloride is precipitated and is then separated from the liquid and washed. This calcium chloride solution which is essentially liquid calcium chloride, either is used as a commercial product or liquid calcium chloride is concentrated by evaporation under vacuum at 80–100° C. till precipitation of the crystals of calcium chloride in the form of $CaCl_2 \cdot 2H_2O$ occurs (cf., e.g., "Work on Soda Ash Technology," Research Institute for Basic Chemistry, 1961, Goskhimizdat Publishers, vol. XIII, pp. 10–19).

A disadvantage of said known method resides in the formation of gypsum deposits on the heating surfaces of the evaporators due to the presence of sulphate-ion ($SO_4''$) in the distillation liquid.

The deposits of gypsum result in a reduced efficiency of the evaporators and involve a regular and laborious mechanical cleaning of the evaporator heating surfaces.

Even if such a cleaning is practicable for evaporators having big-diameter stub heating pipes, in modern evaporators possessing long pipes (of the order of 5 metres) of a small diameter (about 30 mm.) mechanical cleaning is rendered almost impracticable.

In order to prevent formation of gypsum deposits on the heating surfaces of evaporators the distillation liquid prior to evaporation is purified from the sulphate-ion ($SO_4''$) by adding thereto barium chloride to precipitate sulphate-ion in the form of barium sulphate.

However, such a modification of the above process makes it highly expensive.

Moreover, barium chloride being a toxic substance, this precludes the use of sodium chloride isolated in the above process, as common salt and, therefore, makes the process of producing calcium chloride less advantageous as it might be if it is accompanied by the isolation of such a valuable product as common salt. Thus, the above-mentioned modification aimed at the prevention of gypsum deposits, "per se" results in undesirable effects. Numerous attempts that have been made to solve or overcome this contradiction proved to be failures.

It is therefore an essential object of the present invention to provide such a method of producing calcium and sodium chlorides from the distillation liquid of the ammonia soda ash production process that would practically prevent the formation of gypsum deposits on the heating surfaces of the evaporators or at least considerably retard said formation, without involving prerefining of the distillation liquid from barium which would make it possible to obtain common salt as a result of the same process.

Said and other objects are achieved due to the fact that the starting distillation liquid, according to the invention is mixed with an evaporation-concentrated solution of calcium chloride at such a ratio that during evaporation of said mixed solution the concentration of calcium chloride therein should be maintained at 28–45 wt. percent in each of the evaporators of the plant.

Mixing of the starting distillation liquid with the preliminarily evaporation-concentrated calcium chloride solution is expedient to effect by pouring said liquid separately into each of the evaporators which already contains the evaporation-concentrated solution of calcium chloride.

It has been established that running the process in such a way does not provoke gypsum deposits when evaporating the distillation liquid containing sulphate-ion in a quantity as high as 1.5 g./l. Mixing of a low-concentration (with respect to calcium chloride) distillation liquid taken in an amount of 8–11 wt. percent, with a highly evaporation-concentrated solution of calcium chloride (28–45 wt.-percent) results in that calcium sulphate, according to the conditions of solubility thereof, can no longer be in a dissolved state in such a mixed solution and is salted out into a solid phase in the volume of the liquid being evaporation-concentrated.

The weight percentage of calcium sulphate precipitated into solid phase equals 80–90% of its initial content in the distillation liquid.

The thus-precipitated calcium sulphate cannot deposit on the heating surfaces of the evaporators, whereas sulphate-ion remaining in the solution under evaporation is contained therein in such a negligible amount that no gypsum deposits occur within a rather prolonged period of operation of the evaporators.

In what follows the present invention is exemplified by the description of the embodiments thereof to be had in conjunction with the accompanying drawings, wherein a multiple-effect evaporator is diagrammatically represented.

The distillation liquid of the ammonia soda ash production process, prior to being evaporation concentrated, is desolidized by sedimentation. When necessity arises for purifying the liquid from dissolved calcium hydroxide, it is additionally subjected to carbonization.

According to the present invention the thus-purified and desolidized liquid is introduced into evaporators 1, 2, 3 of a multiple-effect evaporating plant as indicated by the arrow $a$, said evaporators already containing a solution of calcium chloride evaporation-concentrated to 28–45 wt. percent.

Fresh distillation liquid is mixed in each of the evaporators 1, 2, 3 with a concentrated calcium chloride solution therein.

The amount of the fresh distillation liquid introduced into each evaporator is maintained at such a level that the calcium chloride concentration in a mixed solution during the evaporation process is within 28–45 wt. percent. Mixing and evaporation of the liquid result in that sodium chloride, calcium sulphate and calcium hydroxide are precipitated in each of the evaporators. The precipitated substances are continuously taken off the evaporators as a pulp whose liquid phase is essentially a solution of calcium chloride.

The pulp is precipitation-separated and centrifuged.

A clarified calcium chloride solution at a concentration of 28–45 wt. percent is utilizable as a commercial product, viz., liquid calcium chloride or is reprocessed into solid calcium chloride by evaporating to a concentration of the order of 70–72 wt. percent followed by the crystallization of the resulting cake on a cooled surface.

The precipitate of sodium chloride isolated from the pulp by centrifugation, is utilizable as a commercial product, recoverable during the soda ash production process or can be refined by the conventional technique, say, by washing to get rid of impurities and dispensed as common salt.

The process of concentration of the distillation liquid by evaporation is practicable to effect in a tubular heat exchanger, steam being fed into the steamchest outside of the tubes thereof along the arrow $b$ in the drawing.

The advantageous features of the above-described method of producing sodium and calcium chlorides reside in the fact that practically no gypsum deposits on the heating surfaces of evaporators occur, whereby the expensive process of purifying the distillation liquid with barium chloride may be dispensed with and the entire production process is made considerably cheaper.

Moreover, dispensing with the use of barium chloride which is a toxic agent, makes it possible to obtain common salt as a by-product of the process, this adding more to the economic effect thereof.

EXAMPLE 1

The distillation liquid of the ammonia soda ash production process, clarified by sedimentation and containing (in wt. percent): calcium chloride, 11; sodium chloride, 6; calcium sulphate, 0.1; calcium hydroxide, 0.1; water, 82.8, is introduced (along the arrow $a$ in the drawing) into the evaporators 1, 2, 3 featuring the outside boiling zone, at a rate of 250 kg. per hour into each evaporator which contains 600 litres of a concentrated calcium chloride solution. To effect evaporation steam is fed into the intertubular space of the first evaporator (along the arrows $b$) at a pressure of 7 kg./cm.$^2$, whereas fed into the remaining two evaporators (along the arrows $c$) is steam which results from boiling of the solution in the preceding evaporator.

The amount of the distillation liquid feed to be mixed with the concentrated calcium chloride solution is so selected that with the given volume of the continuously evaporated solution already available in the evaporator, the calcium chloride concentration in a mixed solution is equal to 35 percent.

There are continuously discharged from each evaporator 90 kg. of pulp per hour (along the arrows $d$ in the drawing), said pulp containing about 14 kg. of sodium chloride precipitate, whereupon the pulp is concentrated by sedimentation.

The clarified liquid which is essentially a 35–36 percent solution of calcium chloride, is separated from the sodium chloride precipitate.

The precipitate is centrifuged and washed to obtain common salt containing sulphate-ion not in excess of 0.1 and Ca$^{2+}$ ion, 0.25 wt. percent.

No gypsum deposits are found to form on the evaporator heating surfaces within a two-month period of continuous operation of the evaporating plants featuring their heating tubes 38 x 2 mm. dia. and 5 m. long, while when operating by the conventional technique gypsum deposits 3–4 mm. thick are found to arise as early as after 12 days of operation so that the evaporating plants have to be stopped for cleaning.

EXAMPLE 2

The sedimentation-clarified distillation liquid of the ammonia soda ash production process, containing (in wt. percent): calcium chloride, 10.5; sodium chloride, 5.5; calcium suphate, 0.15; calcium hydroxide, 0.1; water, 83.75, is introduced into two tubular evaporators at a rate of 20 tons/hr. per evaporator, each of these containing 30 m.$^3$ of a concentrated calcium chloride solution.

To effect evaporation heating steam at a pressure of 4 kg./cm.$^2$ is fed into the intertubular space of the first evaporator, while fed into the other evaporator is steam resulting from the boiling of the solution in the first one.

The concentration of calcium chloride in the solution resulting from the mixing of the distillation liquid with the concentrated solution and fed into the heat exchanger of the evaporator, is maintained at about 40 wt. percent.

6.2 tons/hr. of pulp are continuously discharged from each evaporator, said pulp containing 1 t. of sodium chloride precipitate, whereupon the pulp is sedimentation-concentrated.

The clarified liquid which is essentially a 39–40 percent calcium chloride solution is separated from sodium chloride precipitate. The precipitate is centrifuged and washed to obtain common salt containing 0.3 wt. percent of Ca$^{2+}$ ion.

No gypsum deposits are liable to form on the heating surfaces within an eight-month period of continuous operation of evaporators featuring heating tubes of 38 x 2 mm. dia. and 5 m. long.

EXAMPLE 3

The sedimentation-clarified distillation liquid of the ammonia soda ash production process containing (in wt. percent): calcium chloride, 10.0; sodium chloride, 5.5; calcium suphate, 0.1; calcium hydroxide, 0.1; water, 84.3, is introduced into two tubular evaporators at a rate of 20 tons/hr. per evaporator, each of these containing 30 m.$^3$ of a concentrated calcium chloride solution.

To effect evaporation heating steam at a pressure of 3 kg./cm.$^2$ is fed into the intertubular space of the first evaporator, whereas fed into the other evaporator is steam resulting from boiling of the solution in the preceding evaporator.

The concentration of calcium chloride in the solution resulting from the mixing of the distillation liquid with the concentrated solution and fed into the heat exchanger of the evaporator, is maintained at about 28 wt. percent.

There are continuously discharged from each evaporator 8 tons/hr. of pulp containing 0.8 ton of sodium chloride precipitate, whereupon said pulp is sedimentation concentrated.

The clarified liquid which is essentially a 28–29 percent solution of calcium chloride, is separated from the sodium chloride precipitate. The precipitate is centrifuged and washed to obtain common salt containing 0.2 wt. percent of $Ca^{2+}$ ion.

No gypsum deposits are found to arise on the heating surfaces of the evaporators within a 30-day period of continuous operation thereof, the heating tubes of said evaporators being 38 x 2 mm. dia. and 5 m. long.

What we claim is:

1. A method of producing calcium chloride and sodium chloride in parallel feed connected evaporators of a multiple-effect evaporating plant, from the distillation liquid of the ammonia soda ash production process, said method clarifying said liquid, mixing said clarified liquid with a concentrated calcium chloride solution at such a ratio that during evaporation of said mixed solution the concentration of calcium chloride in said mixed solution is maintained at 28–45 wt. percent in the evaporators of said evaporating plant, steam for evaporation being fed consecutively through all the evaporators of the plant.

2. A method as claimed in claim 1, wherein the starting distillation liquid is introduced separately into each of the evaporators which contains concentrated calcium chloride solution.

References Cited
UNITED STATES PATENTS

| | | | |
|---|---|---|---|
| 3,155,458 | 11/1964 | Fidelman et al. | 23—89 X |
| 3,329,479 | 7/1967 | Hustinx | 23—89 X |
| 3,365,278 | 1/1968 | Kelley et al. | 23—296 |

NORMAN YUDKOFF, Primary Examiner

J. SOFER, Assistant Examiner

U.S. Cl. X.R.

23—89, 304, 90; 159—17 P, 47